United States Patent [19]
Johnson, Jr.

[11] Patent Number: 5,321,847
[45] Date of Patent: Jun. 14, 1994

[54] APPARATUS AND METHOD FOR DETECTING INTERMODULATION DISTORTION IN A RADIO FREQUENCY RECEIVER

[75] Inventor: Robert M. Johnson, Jr., Lake Zurich, Ill.

[73] Assignee: Motorola, Inc., Schaumburg, Ill.

[21] Appl. No.: 736,191

[22] Filed: Jul. 26, 1991

[51] Int. Cl.$^5$ .............................................. H04B 1/26
[52] U.S. Cl. ............................. 455/63; 455/295; 455/303; 455/308; 455/310; 375/102
[58] Field of Search ............... 455/295, 296, 297, 303, 455/308, 310-311, 63, 33.1, 249.1, 305; 375/102

[56] References Cited

U.S. PATENT DOCUMENTS

| | | | |
|---|---|---|---|
| 4,126,828 | 11/1978 | Kumagai | 455/295 |
| 4,430,619 | 2/1984 | Epsom et al. | 455/295 |
| 4,955,073 | 9/1990 | Sugayama | 455/161.1 |
| 5,170,392 | 12/1992 | Riordan | 455/295 |

FOREIGN PATENT DOCUMENTS

| | | | |
|---|---|---|---|
| 0103455 | 6/1982 | Japan | 375/102 |
| 63084314 | 4/1986 | Japan . | |
| 0255130 | 11/1986 | Japan | 455/295 |
| 61065518 | 4/1988 | Japan . | |

OTHER PUBLICATIONS

Electronic Industries Association (EIA)-553 Mobile Station-Land Station Compatibility Specification. Sep. 1989.

Technical Paper entitled, "Intercept Point and Undesired Responses", by Richard C. Sagers, in care of Motorola, Inc., and presented before the 32nd IEEE Vehicular Technology conference, May 23-25, 1982.

*Primary Examiner*—Reinhard J. Eisenzopf
*Assistant Examiner*—Andrew Faile
*Attorney, Agent, or Firm*—Kevin D. Kaschke

[57] ABSTRACT

A radio frequency receiver (300) typically contains electronic devices commonly used in amplifying or mixing circuits (315) which are seldom ideal. The non-ideal characteristics of these devices lead to intermodulation (IM) distortion. A measurement of the amplitude of the received signal (301) is taken both unattenuated (503) and attenuated (507). The difference between the two measurements is compared (511) to predetermined limits (L1, L2 or L3) wherein the received signal (310) is determined to be valid, invalid or unsure. A valid received signal is demodulated in the receiver (300). An invalid signal, confirming the presence of IM distortion, is rejected. The unsure signal may be rejected or demodulated as determined by the receiver designer. This type of signal characterization is particularly useful for cellular radiotelephones (101) attempting to gain access to the system provider (111) in which it is registered.

31 Claims, 5 Drawing Sheets

APPARATUS AND METHOD FOR DETECTING INTERMODULATION DISTORTION IN A RADIO FREQUENCY RECEIVER

FIELD OF THE INVENTION

The present invention relates generally to receivers, and more particularly to an apparatus and a method for minimize intermodulation distortion in a radiotelephone receiver.

BACKGROUND OF THE INVENTION

A radio frequency (RF) receiving device, of which a cellular radiotelephone mobile subscriber unit is a convenient example, provides an appropriate setting for describing the need for the present invention. Subscriber units are designed to operate with all cellular systems (for example: A or B) that provide competing services in a particular geographical area. Each system is assigned a number of channels with a particular channel spacing and each channel has a particular center frequency as called out in Electronic Industries Association (EIA)-553, § 2.1.1.1 "Mobile Station-Land Station Compatibility Specification", September 1989. The subscriber unit gains access to the system in which it is registered, System A for example, by scanning the access channels to determine the strongest two access channels per EIA-553, § 2.6.3.2. Upon gaining access, the subscriber unit may communicate through the System A provider with the landline system. However, the subscriber unit also receives signals from the System B provider which may produce one or more undesired signals in the subscriber unit on the same channel as the desired signal from System A. The undesired signal created from System B signals is of no use to the subscriber unit desiring service from System A. A receiver typically determines which channel to use by measuring the channels signal strength. But, a receiver cannot distinguish between the undesired and desired signals using only signal strength information. Since the undesired signal strength information may be generated by the System B provider, the system access signal may be on the undesired signal channel and the subscriber unit may roam to the undesired signal channel. If both of the two strongest signals from the access channel scan are undesired signals without access system modulation (typically 10 KHz manchester) the subscriber unit will lose service and the no service light will turn on. Thus, economical receiver technology has not reached the point where the mobile subscriber unit can operate with impunity close to one system's transmitting base station while communicating with the other.

A particular undesired signal response produced by receivers is commonly referred to as intermodulation distortion (IM). IM distortion develops in the presence of two unmodulated interfering signals so separated from the assigned input signal frequency and from each other that the n'th order mixing of the two undesired signals can occur in nonlinear electronic devices of the receiver producing a third signal whose frequency is equal to that of the assigned input signal frequency. The transfer functions of electronic devices commonly used in amplifying and mixing circuits within receivers are seldom if ever ideal—linear in the case of an amplifier, square law in the case of a mixer. The non-ideal characteristics inherent in these devices lead to IM distortion.

It is well known that a 1 dB change in signal strength of the interfering signals results in a 3 dB change in signal strength of the undesired third order IM distortion. Those wishing to understand the background for this 3:1 relationship may reference a paper presented by Richard C. Sagers of Motorola Inc. entitled "Intercept Point and Undesired Responses", presented before the 32nd IEEE Vehicular Technology Conference May 23–25, 1982. Knowing this 3:1 relationship is very helpful in detecting IM distortion in receivers and is commonly used in designing receivers to maximize the rejection of IM distortion.

Consumer radio receivers, such as an AM/FM radio, process a received voice signal through an attenuator automatically via control circuitry or when the user manually depresses the "local/DX" button in response to receiving a degraded channel. In areas where the receiver encounters a desired voice signal and a strong interfering voice signal causing third order IM distortion, the attenuator reduces the desired voice signal by the magnitude of the attenuator whereas the third order IM distortion in the receiver is reduced by three times the magnitude of the attenuator. Thus, signal reception of the desired signal is improved.

For many situations, of which a cellular radiotelephone mobile subscriber unit is merely an example, the prior art has not produced an apparatus or method of channel characterization to meet the difficult requirement of detecting IM distortion while providing for the advantage of an economical receiver.

DETAILED DESCRIPTION OF A PREFERRED EMBODIMENT

Figure 1:
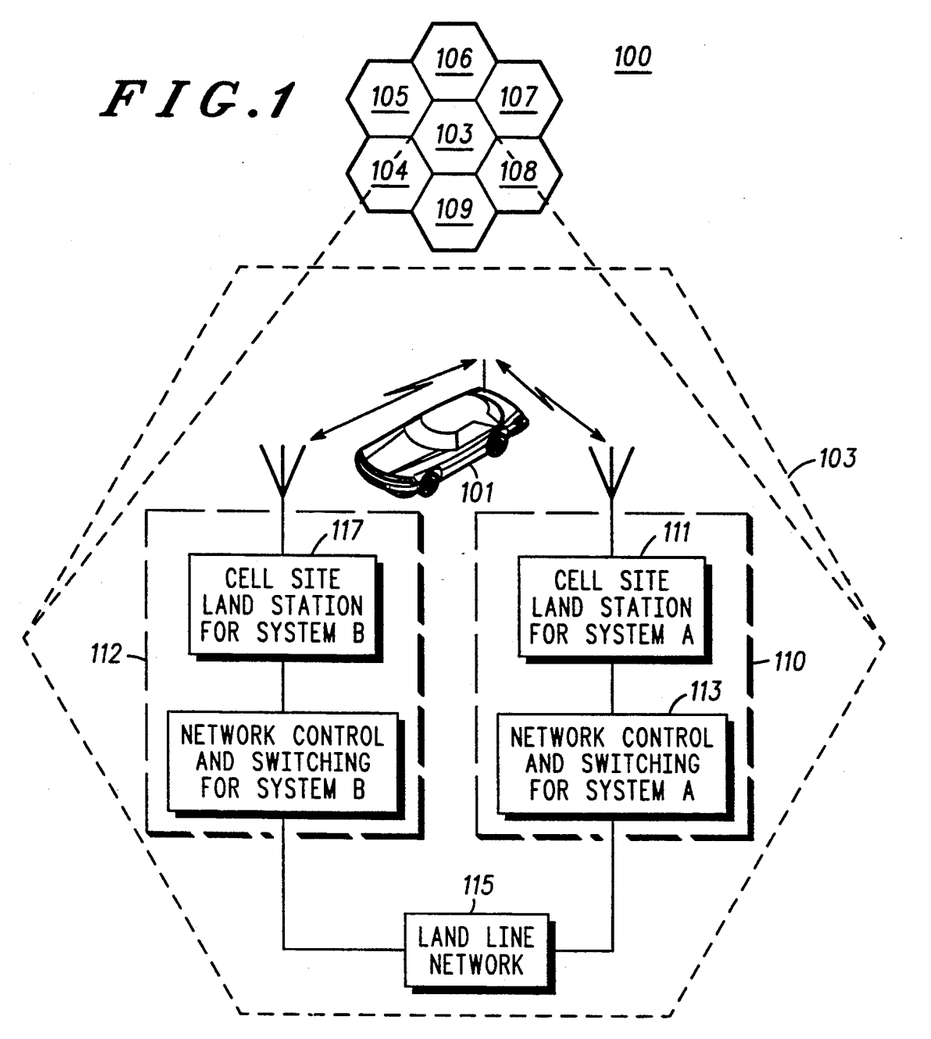
FIG. 1 is a diagram of a mobile subscriber unit mounted in a vehicle and operating in a cellular radiotelephone system having two system providers (A and B).

FIG. 1 is a diagram of a mobile subscriber unit 101 operating in a cellular radiotelephone system 100 having two system providers (A 110 and B 112). The cellular system 100 is designed to supply mobile telephone service using a "cellular" radio coverage plan. This plan divides a geographical area into a number of coverage areas or "cells" 103–109 with each cell being assigned to a portion of the available radio channels. The channels used in one cell are again useable in spatially separated cells in the same Mobile Service Area (MSA) 100.

Recommended minimum standards for the subscriber unit 101 for use in the 800 MHz cellular operating band may be found in the Cellular System Mobile Station-Land Station Compatibility Specification EIA-553 which assures that the subscriber unit 101 can obtain service in any cellular system that meets the compatibility requirements of EIA-553. Compatibility, used in connection with EIA-553, is understood to mean any subscriber unit 101 able to place and receive calls in any cellular system, and all cellular systems are able to place and receive calls with any subscriber unit 101. To assure compatibility, it is essential that both radio-system parameters and call-processing parameters be specified. The sequence of call-processing steps that the mobile and land stations execute to establish calls has been specified in EIA-553 along with the digital control messages and analog signals that are exchanged between the system provider and the subscriber unit 101.

The subscriber unit 101 communicates with a distributed array of cell-site land stations, for example 111. The cell-site land station 111 is controlled by the cellular-system network control and switching equipment 113 that provides connection to the worldwide telecommunications network 115. A call between the land network 115 and a subscriber unit 101 is routed via the cellular control system 113 to the cell-site 103 that best serves the location of the subscriber unit 101. A call in progress can proceed indefinitely as the subscriber unit moves from cell to cell throughout the MSA 100 since it is automatically reassigned to an available channel within a new cell.

Some of the channels within each cell are dedicated to the control of the subscriber unit 101. This includes locating a particular subscriber unit 101, processing a subscriber-originated call, and performing other system control functions. The remaining channels are used for voice communication. The subscriber unit 101 gains access to the control channels by examining the signal strength of each of a predetermined number of potentially available channels and chooses the two channels with the strongest signals. The subscriber unit 101 then tunes to the strongest control channel.

A subscriber unit is intended to be used while in motion or during halts at unspecified points. It is assumed that the subscriber unit 101 includes portable units as well as units installed in vehicles. The basic purpose of cellular telecommunications includes voice and data communication.

FIG. 1 and the associated description provides the setting for the solution provided by the present invention. Simply stated, when the subscriber unit 101 is registered with System A and drives to a location in the MSA 100, which is far from a System A cell-site 111 and close to a System B cell-site 117, the subscriber unit 101 produces IM distortion. The input signal is characterized during the aforementioned channel access routine to determine if the input signal is from the subscriber unit's registered system or generated intermodulation distortion caused by a strong signal from the other system. The advantage offered by the present invention, not found in the prior art, enables a subscriber unit in a cellular system, specifically, to drive near the transmitting site 117 of the other system and maintain access to the far away transmitting site 111 of the system in which the subscriber unit is registered.

Figure 2:
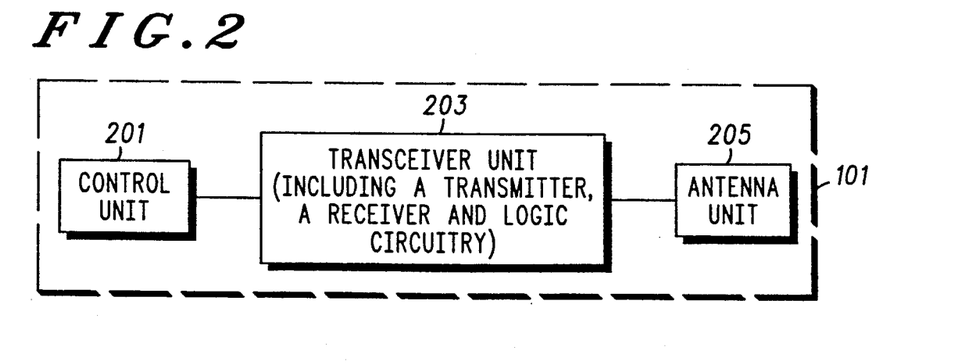
FIG. 2 is a block diagram of a radiotelephone subscriber unit.

The subscriber unit 101 required for a cellular system is shown in FIG. 2 and consists of the following units: a control unit 201, a transceiver unit 203 (including a transmitter, a receiver and logic circuitry), and an antenna unit 205. Although FIG. 2 depicts the control unit 201, the transceiver unit 203 and the antenna unit 205 as three separate units, all three may be contained within a single housing if the physical dimensions permit either mounting the combined unit within reach of the vehicle operator, or using it as a hand-held "portable" unit.

The control unit 201 is the interface between the subscriber and the system. The subscriber interface requirements may include a handset, a keypad, a loud speaker, all subscriber-unit controls, indicators, and, if provided, the digit display, with all of which the subscriber interacts during the process of placing or receiving a call. Portions of the control unit 201 may be mounted in physically separate packages. A microphone and loudspeaker combination or other peripherals may be used in place of the handset to provide a means of using the system without holding the handset.

The transceiver unit provides duplex voice transmission and reception. The radio frequency (RF) band is divided into two separate 25 MHz wide segments each consisting of 832 channels. The first segment from 824 to 829 MHz, contains the subscriber-unit transmit channels. The second segment, from 869 to 894 MHz, contains the subscriber-unit receive channels. Each subscriber-unit transmit channel is separated from its duplex receive channel by 45 MHz.

The antenna unit 205 connects to the transceiver unit 203 and consists of a vertically-polarized broad-bandwidth antenna.

Figure 3A:
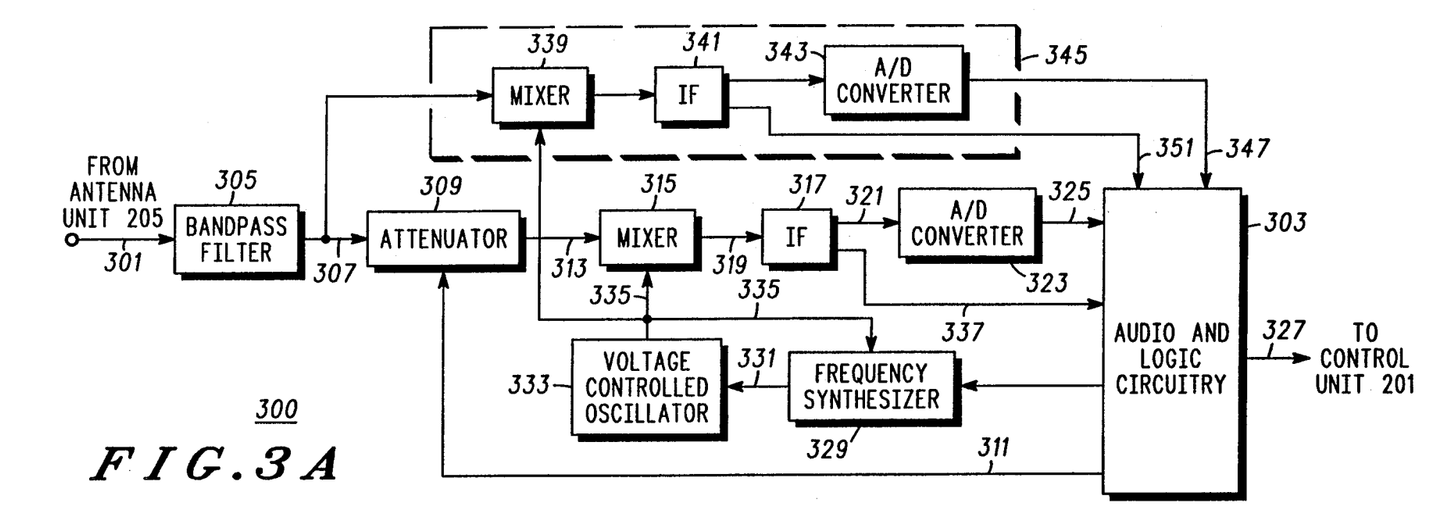
FIG. 3A is a block diagram of the receiver portion of the transceiver unit of FIG. 2.

Now referring to FIG. 3A, there is shown a receiver portion of the transceiver unit 203 of FIG. 2. Received signals at line 301, entering through the antenna unit 205 from the cell-site 111, arrive at the receiver where they are amplified and demodulated. The signals may be voice (which is passed to the control unit 201) or coded signalling information (which is passed to the logic circuitry 303 for decoding).

Examples of the coding orders received from a cell site include orders to tune a transceiver to a new frequency channel, to alert the subscriber to an incoming call, to adjust the transceiver output power and to release the subscriber unit upon completion of a call.

The input signal at line 301 is processed through a broad band bandpass filter 305 that only allows subscriber unit receive channels from 869 to 894 MHz to be considered for demodulation by the receiver. System A transmits signals from 869 to 880 MHz and from 890 to 891.5 MHz. System B transmits signals from 880 to 890 MHz and from 891.5 to 894 MHz. A filtered input signal at line 307 is processed by an attenuator 309 having a predetermined magnitude of attenuation and selectively coupled to a mixer 315 by a control signal at line 311. In the preferred embodiment, the mixer 315 is the nonlinear stage most likely to produce intermodulation distortion in the receiver. With the attenuator disabled, the filtered input signal at line 307 is coupled to the mixer 315 unattenuated. With the attenuator enabled, the amplitude of the filtered input signal signal is attenuated by the predetermined magnitude before it is coupled to the mixer 315. The mixer 315 converts the frequency of the filtered input at line 313 signal to an intermediate frequency at line 319. Intermediate frequency block 317 processes the intermediate frequency signal at 319 to generate a received signal providing radio signal strength indication (RSSI) at 321, provide selectivity for adjacent and alternate channel interference protection and processes the intermediate frequency signal into a signal suitable for the audio band at 337. The received signal providing RSSI at 321 is converted from an analog to a digital signal at 323 wherein the digital signal at 325 is coupled to the audio and logic circuitry 303. The logic circuitry measures the amplitude of the received signal. In the preferred embodiment, a Motorola, Inc. microprocessor MC68HC11E9 is used as part of the logic circuitry and includes memory locations for storing received data to be processed. Thus, the amplitude of the input signal may be measured both attenuated and unattenuated with the attenuator being switched in and out, respectively. The audio signals at 337 processed by the IF block 317 pass through the logic circuitry 303 to the control unit 201 at lines 327. The logic circuitry 303 sends processed channel information to a frequency synthesizer 329. The frequency synthesizer 329 typically includes a crystal oscillator as a frequency reference and a phase detector that, when combined with the channel information and an output signal at line 335 from voltage controlled oscillator (VCO) 333, generates a control voltage signal at line 331 to adjust the frequency of the VCO 333. The VCO 333 supplies the output signal at line 335 to the mixer 315 which converts the RF signal at line 313 to the intermediate frequency at line 319.

The apparatus of the present invention is not intended to be limited to the specific receiver block diagram of FIG. 3A. The apparatus of the present invention may be implemented with any receiver wherein the input signal passes through the attenuator 309 before a nonlinear receiving stage most likely to produce IM. The measurement of the received signal strength occurs after the nonlinear receiving stage most likely to produce IM.

The apparatus and method of the present invention is not limited to a receiver structure in which the unattenuated and attenuated samples of the received signal are taken at separate times. The present invention may also be implemented utilizing a parallel path receiver structure wherein the unattenuated and attenuated samples of the input signal may be taken at the same time. A parallel path receiver structure comprises the block diagram of FIG. 3A with the attenuator enabled so that an attenuated sample of the input signal may be taken by the logic circuitry 303 in addition to a second receiver path 345 having a mixer 339, intermediate frequency stage 341 and an A/D converter 343 serially coupled together. The filtered input signal at line 307 is coupled to the mixer 339 unattenuated. The mixer 339 utilizes the same signal 335 from the VCO 333 as the other mixer 315. The output from the A/D converter 343 is coupled to the logic circuitry 303 at line 347. The audio signals at 351 processed by the IF block 341 pass through the logic circuitry 303 to the control unit 201 at lines 327. The second receiver path 345 is utilized to obtain an unattenuated sampled of the input signal. Thus, a second embodiment of the present invention utilizing two receiver paths provides the opportunity to obtain samples of the input signal's amplitude both attenuated and unattenuated at the same time.

Figure 3B:
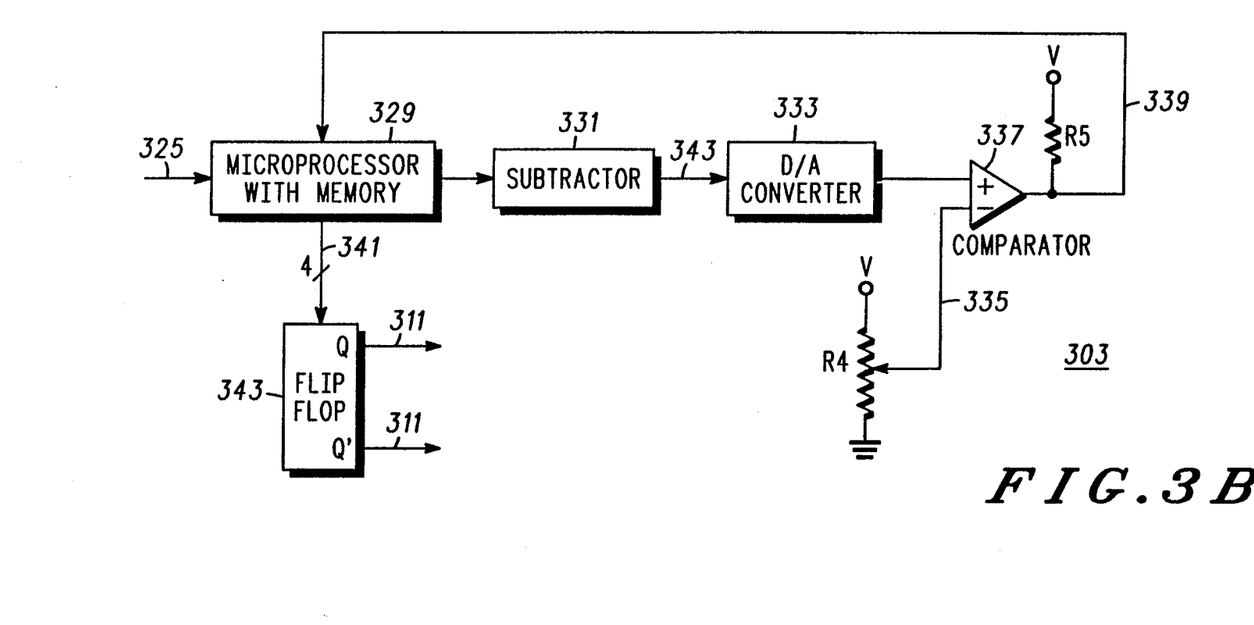
FIG. 3B is a block diagram of a portion of the logic circuitry 303 illustrated in FIG. 3A.

FIG. 3B is a block diagram of a portion of the logic circuitry 303 illustrated in FIG. 3A. The RSSI level of the received signal generated by the intermediate frequency block 317 is converted from a corresponding DC voltage signal at line 321 to a digital signal at line 325 by the A/D Convertor 323 and stored in a memory location of the microprocessor 329. The input signal is attenuated by switching in the attenuator 309 responsive to the control signals at lines 311. The microprocessor 329 is coupled to the flip flop 343 via four control lines at 341 (typically set, reset, data and clock). The flip flop may be a conventional D-type flip flop having a part number MC74HC74 and available from Motorola Inc. The control signals at lines 341 manipulate the control signals 311 of the flip flop in a conventional manner such that Q and Q' are opposite logic levels (high and low). The RSSI level of the attenuated received signal generated by the intermediate frequency block 317 is converted to a corresponding DC voltage signal and stored in another memory location of the microprocessor 329. The RSSI level of the attenuated received signal is subtracted from the RSSI level of the unattenuated received signal in a subtractor at block 331. The result of the subtractor 331 is a difference signal 343 that is converted to an analog signal at block 333 and compared to a reference signal at line 335 in a comparator 337. The D/A convertor may be a quad six bit D/A having a part number MC144111 and the comparator may be an MC3302 quad comparator with an open collector output both supplied by Motorola Inc. The reference signal at line 335 is determined by a variable resistor R4 biased to a supply voltage, V. The reference signal at line 335 corresponds to at least one of the limits L1, L2 and L3 discussed with FIGS. 6A and 6B. The comparator 337 generates decision control signal 339 that has a logic high or a logic low level, biased by a pull up resistor R5 to the supply voltage V, for the microprocessor 329. If the decision control signal 339 is a logic high, the received signal is determined to be a valid signal and the input signal is processed. If the decision control signal 339 is a logic low, the input signal is determined not to be a valid signal and nontypical actions are taken by the microprocessor 329. The nontypical actions will be discussed with FIGS. 5A through 6B.

Figure 4:
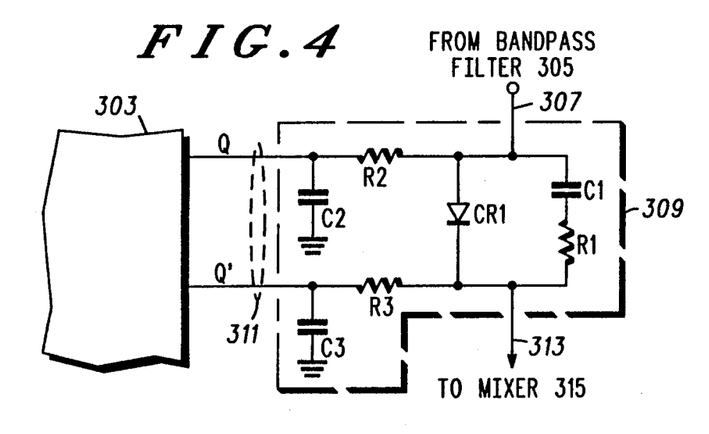
FIG. 4 is a detailed circuit diagram of the attenuator of FIG. 3A controlled by a portion of the logic circuitry.

Now referring to FIG. 4, there is shown a detailed circuit of the attenuator 309 coupled to a portion of the logic circuitry 303 by line 311. The attenuator circuit of FIG. 4 is shown as an example only. Other attenuator circuits may be implemented in the apparatus of the present invention. The attenuator 309 comprises a conventional arrangement of resistors R1, R2 and R3, capacitors C1, C2 and C3, and a PIN diode CR1. The attenuator 309 is enabled when the logic circuitry 303 produces a logic high and logic low at outputs Q' and Q, respectively. With the attenuator enabled, the input signal at line 307 is coupled to the mixer 315 at line 313 through DC blocking capacitor C1 and resistor R1. The DC blocking capacitor C1 minimizes current drain in the attenuator 309 when the attenuator 309 is activated. Resistor R1 provides a series attenuation of the received signal 307.

To disable the attenuator, a logic low and a logic high signal is applied to Q' and Q, respectively, by the logic circuitry 303. With the attenuator 309 disabled, the PIN diode CR1 is forward biased effectively becoming a short-circuit between the bandpass filter 305 and the mixer 315 allowing the input signal to pass unattenuated. Resistors R2 and R3 provide DC current limiting when the attenuator is disabled and minimizes the RF signal loss between the bandpass filter 305 and the mixer 315. By-pass capacitors C2 and C3 shunt digital noise from the logic circuitry 303 to ground, thus preventing corruption of the received signal at line 307. In the preferred embodiment, $R1=220\Omega$, $R2=2.2K\Omega$, $R3=2.2K\Omega$ and $C1=C2=C3=33pF$ providing a typical attenuation of 8 dB.

Figure 5A:
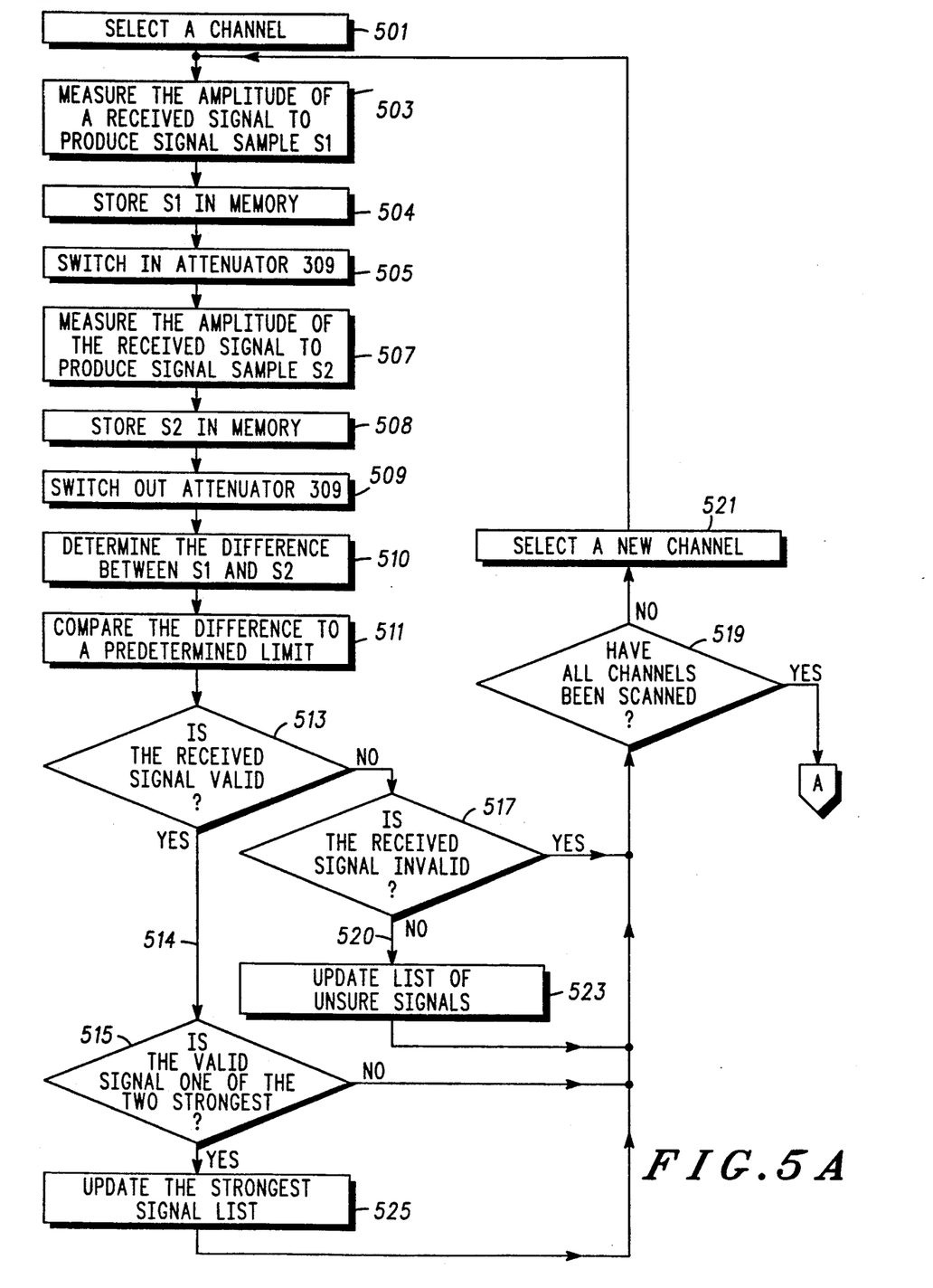
FIG. 5A is a logic flow diagram employed by the logic circuitry of FIG. 3A to select an access channel.

Now referring to FIG. 5A, there is shown a novel flow diagram describing a portion of the process of the present invention carried out in the logic circuitry 303. The flow diagram describes the novel process of characterizing the input signal to determine if the received signal is valid, invalid, or unsure. The signal characterization is used to gain access to the system service provider in which the radiotelephone is registered without being distracted by strong signals from the other system service provider. The logic circuitry selects a channel at 501, then measures the amplitude of the received signal S1 at 503 with the attenuator 309 switched out. The measured amplitude of received signal S1 is stored in a memory location at 504 in the logic circuitry 303. The attenuator 309 is switched into the path of the received signal at 505 by line 311 from the logic circuitry 303. The amplitude of the attenuated received signal is measured at 507. The measured amplitude of received signal strength S2 is stored in a second memory location at 504 in the logic circuitry 303. The attenuator is then switched out of the path of the received signal at 509. To obtain the best measurements the unattenuated and attenuated received signals are taken within a predetermined time period, such as less than one millisecond. The quick sampling of the two signals will minimize the effects of channel variation, due to fading for example, while taking the two measurements. Thus, the logic circuitry 303 has acquired an unattenuated measurement S1 of the receive signal strength and an attenuated measurement S2 of the receive signal strength for a given input signal.

The difference between the unattenuated signal strength measurement and the attenuated signal strength measurement S2 is determined at block 510. The difference is compared to a predetermined limit at block 511. The result of the comparison is processed at 513 to determine if the received signal corresponding to a selected input signal is valid. A valid signal is an input signal in which the measured difference between the amplitude of the attenuated received signal and the amplitude of the unattenuated received signal is substantially equal to the predetermined magnitude of the attenuator 309. If the received signal is valid, a determination is made if it is one of the two strongest received signals of all selected channels at 515. If the valid signal is one of the two strongest, the strongest signal list is updated with the valid signal at 525. The flow continues to block 519 to determine if all the channels have been scanned.

If the received signal is determined not to be valid at 513, the received signal is processed at 517 to determine if it is invalid. An invalid signal is a received signal in which the difference between the amplitude of the attenuated input signal and the amplitude of the unattenuated input signal is substantially equal to or greater than three times the predetermined magnitude of the attenuator 309 indicating that IM distortion is present. If the received signal is not determined to be invalid at 517 then it is unsure if the received signal is valid or invalid. Therefore, the list of unsure input signals at 523 is updated with the selected received signal. The flow continues to block 519 to determine if all the channels have been scanned. If the received signal is determined to be invalid at 517 or if the input signal is not determined to be one of the two strongest at 515, a check is made to determine if all the channels have been scanned at 519. If is determined that more channels need to be scanned at 519, a new channel is selected at 521 and the process of taking an attenuated and unattenuated measurement of the received signal corresponding to the selected input signal begins again at block 503.

Figure 5B:
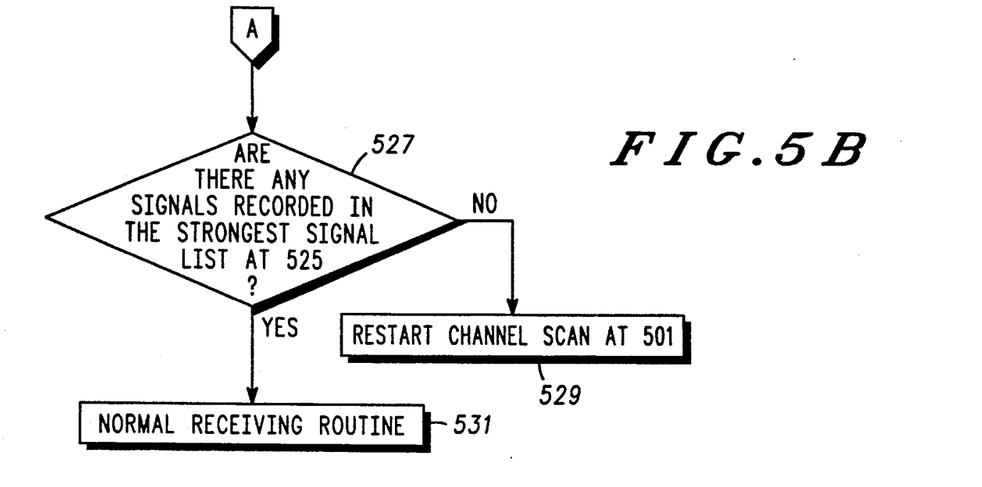
FIGS. 5B and 5C are alternative flow diagrams which may be employed in conjunction with FIG. 5A.

After all the channels have been scanned, the decision flow continue to branch A in FIG. 5B. Branch A uses only valid channels to decide how to process the scanned channels. At decision branch A, the flow continues to decision block 527 wherein a search is made of the strongest signal list at 525. If no valid signals were recorded, the channel scan begins anew at 501 represented by block 529. If valid signals were recorded at 525, the valid signals are used in the normal receiving routine at 531 to gain access to the system provider.

Figure 5C:
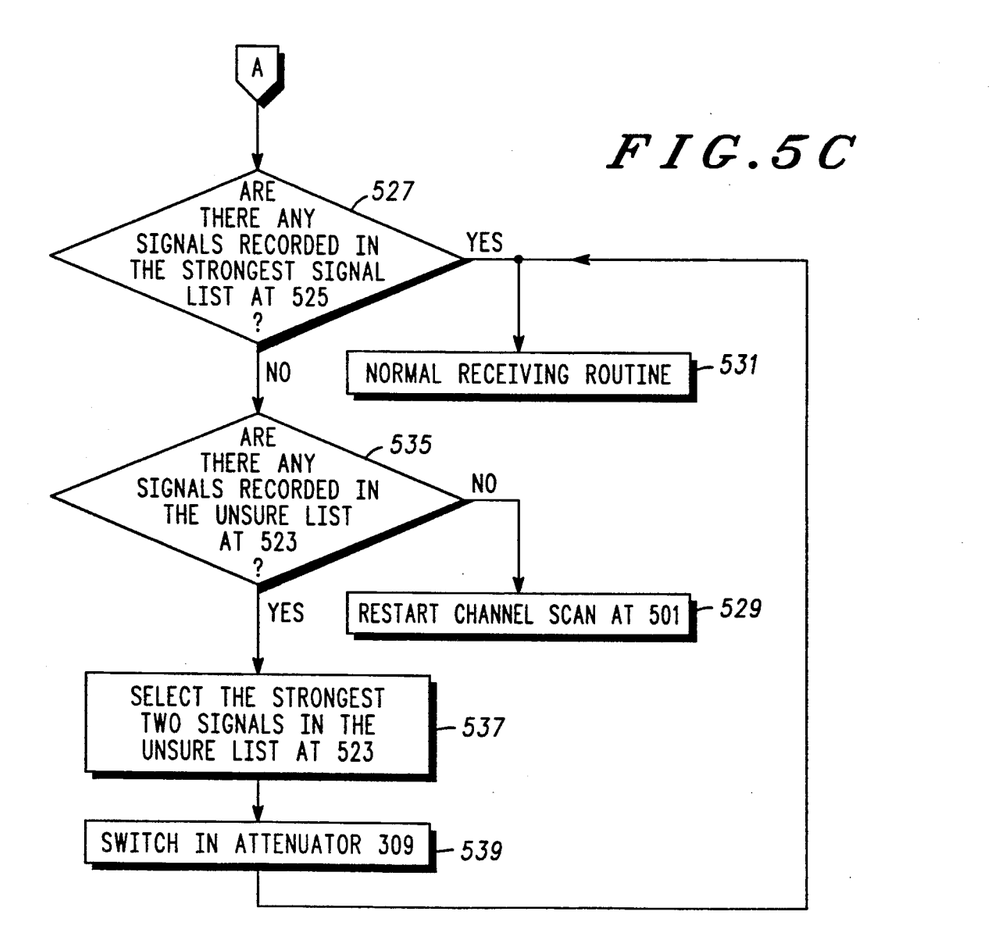

An alternate decision branch A in FIG. 5B is decision branch A in FIG. 5C. Decision branch A in FIG. 5C uses valid channels if they are available and unsure channels if valid channels are not available. At decision branch A, the flow continues to decision block 527 wherein the a search is made of the strongest signal list at 525. If it is determined that valid signals were recorded at 527, the valid signals are used in the normal receiving routine at 531 to gain access to the system provider. If no valid signals were recorded, a determination is made at 535 if there are any signals recorded in the unsure list at 523. If it is determined at 535 that no signals recorded in the unsure list at 523, the channel scan begins anew at 501 represented by 529. If it is determined at 535 that there are signals recorded in the unsure list at 523, two of the strongest unsure signals are selected from the list at 537. The attenuator 309 is switched in at 539 and the two strongest unsure signals are used in the normal receiving routine at 531 to gain access to the system provider.

Figure 6A:
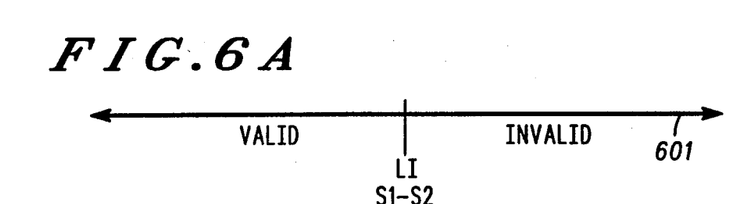
FIGS. 6A and 6B are graphs representing decision regions that aid in characterizing the input signal as valid, invalid or unsure.
Figure 6B:
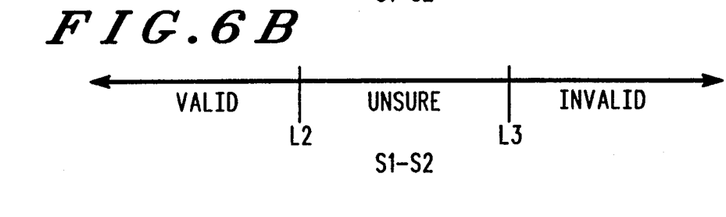

FIGS. 6A and 6B represent simple graphs forming decision regions which are used to determine if the received signal is valid, invalid or unsure. A valid determination is represented in FIG. 5A as decision branch 514. An invalid determination is represented in FIG. 5A as decision branch 518. An unsure determination is represented in FIG. 5A as decision branch 520. The horizontal axis 601 represents the measured difference between the unattenuated amplitude of the received signal, S1, and the attenuated amplitude of the received signal, S2. FIG. 6A shows a predetermined limit L1 separating the measured difference values into two decision regions. Predetermined limit L1 is approximately half way along the expected range of measured difference values on the horizontal axis 601. If the measured difference is less than the predetermined limit L1, the input signal is valid. If the measured difference is greater than the predetermined limit L1, the input signal is invalid.

FIG. 6B shows predetermined limits L2 and L3 dividing the measured difference values into three decision regions: valid, unsure and invalid. If the measured difference is less than the predetermined limit L2, the received signal is valid. If the measured difference is greater than the predetermined limit L3, the input signal is invalid. If the measured difference is between predetermined limits L2 and L3, the received signal is in the unsure range.

Limits L1, L2, and L3 of FIGS. 6A and 6B are presented as alternate examples of deciding what to do with the attenuated and unattenuated signal strength measurements. Other limits and decision regions may be implemented inaccordance with the present invention to detect IM distortion.

What is claimed is:

1. An apparatus for minimizing intermodulation distortion in a radio frequency receiver that receives an input signal having an amplitude, the apparatus comprising:
- means for attenuating the input signal to produce an attenuated input signal having an attenuated amplitude;
- nonlinear receiving means coupled to the input signal and the attenuated input signal for producing a received signal and an attenuated received signal, respectively;
- means for measuring the amplitude of the received signal and the attenuated amplitude of the attenuated received signal to produce a measured amplitude of the received signal and a measured attenuated amplitude of the attenuated received signal, respectively;
- means, responsive to a difference between the measured amplitude of the received signal and the measured attenuated amplitude of the attenuated received signal, for determining the validity of the received signal;
- means for storing a plurality of the received signals responsive to the determined validity of the received signals to produce stored received signals;
- means for ranking the stored received signals responsive to the amplitude of the stored received signals; and
- means for selecting a control channel for the radio frequency receiver responsive to the ranking of the stored received signals.

2. An apparatus in accordance with claim 1 wherein the nonlinear receiving means further comprises:
- first nonlinear receiving means coupled to the input signal; and
- second nonlinear receiving means coupled to the attenuated input signal.

3. An apparatus in accordance with claim 1 further comprising means for switchably coupling the means for attenuating to the input signal, responsive to a control signal, for producing the attenuated input signal when the means for attenuating is switched in and for producing the input signal when the means for attenuating is switched out.

4. An apparatus in accordance with claim 1 wherein the means for attenuating further comprises a predetermined magnitude of attenuation.

5. An apparatus in accordance with claim 1 wherein the means for determining further comprises:
- means for comparing the difference to a reference signal to produce a decision control signal; and
- means, responsive to the decision control signal, for determining the validity of the received signal.

6. An apparatus in accordance with claim 1 further comprising:
- means for storing in a memory the measured amplitude of the received signal; and
- means for storing in a memory the measured attenuated amplitude of the attenuated received signal.

7. An apparatus in accordance with claim 1 wherein a valid received signal, determined by the means for determining, corresponds to the difference being substantially equal to a predetermined magnitude of attenuation provided by the means for attenuating.

8. An apparatus in accordance with claim 1 wherein an invalid received signal, determined by the means for determining, corresponds to the difference being substantially three times a predetermined magnitude of attenuation provided by the means for attenuating.

9. An apparatus in accordance with claim 1 wherein the radio frequency receiver is a radiotelephone receiver.

10. An apparatus in accordance with claim 1 wherein the received signal is a control signal transmitted by a remote cell-site.

11. An apparatus in accordance with claim 1 further comprising means for storing in a memory the amplitude of the received signal if the received signal is determined to be valid.

12. An apparatus in accordance with claim 1 wherein the means for determining further comprises means for establishing decision regions, each region having a range of amplitudes, for determining the validity of the received signal.

13. An apparatus in accordance with claim 12 wherein the decision regions further comprise:
- a first decision region wherein the difference indicates that the received signal is valid; and
- a second decision region wherein the difference indicates that the received signal is invalid.

14. An apparatus in accordance with claim 12 further comprising a third decision region wherein the difference indicates that the received signal is neither valid nor invalid.

15. An apparatus in accordance with claim 1 further comprising means for measuring the amplitude of the received signal and the attenuated amplitude of the attenuated received signal within a predetermined time.

16. An apparatus in accordance with claim 15 wherein the predetermined time period is less than one millisecond.

17. An apparatus in accordance with claim 1 further comprising means for taking a plurality of measurements of the amplitude of the received signal and the attenuated amplitude of the attenuated received signal.

18. An apparatus for minimizing intermodulation distortion in a radio frequency receiver that receives an input signal having an amplitude, the apparatus comprising:
- attenuating means, responsive to a control signal and having a predetermined magnitude of attenuation, switchably coupled to the input signal for producing an attenuated input signal having an attenuated amplitude;
- nonlinear receiving means coupled to the attenuating means for producing a received signal and an attenuated received signal responsive to the input signal and the attenuated input signal, respectively;
- means for measuring the amplitude of the received signal and the attenuated amplitude of the attenuated received signal to produce a measured amplitude of the received signal and a measured attenuated amplitude of the attenuated received signal, respectively;
- means for generating a difference signal responsive to a difference between the measured amplitude of the received signal and the measured attenuated amplitude of said attenuated received signal;
- means for comparing the difference signal to the predetermined magnitude of attenuation to produce a decision control signal;
- means, responsive to said decision control signal, for determining the validity of the received signal;
- means for storing a plurality of the received signals responsive to the determined validity of the received signals;

means for ranking the stored received signals responsive to the amplitude of the stored received signals; and means for selecting a control channel for the radio frequency receiver responsive to the ranking of the stored received signals.

19. A method for minimizing intermodulation distortion in a radio frequency receiver that receives an input signal having an amplitude, the method comprising the steps of:

attenuating the input signal to produce an attenuated input signal having an attenuated amplitude;

coupling nonlinear receiving means to the input signal and the attenuated input signal for producing a received signal and an attenuated received signal, respectively;

measuring the amplitude of the received signal and the attenuated amplitude of the attenuated received signal to produce a measured amplitude of the received signal and a measured attenuated amplitude of the attenuated received signal, respectively;

determining, responsive to a difference between the measured amplitude of the received signal and said measured attenuated amplitude of the attenuated received signal, the validity of the received signal;

storing a plurality of the received signals responsive to the determined validity of the received signals;

ranking the stored received signals responsive to the amplitude of the stored received signals; and selecting a control channel for the radio frequency receiver responsive to the ranking of the stored received signals.

20. A method in accordance with claim 19 wherein the step of coupling the nonlinear receiving means further comprises the steps of:

coupling a first nonlinear receiving means to the input signal; and coupling a second nonlinear receiving means to the attenuated input signal.

21. A method in accordance with claim 19 further comprising the step of switchably coupling a means for attenuating to the input signal, responsive to a control signal, for producing the attenuated input signal when the means for attenuating is switched in and for producing the input signal when the means for attenuating is switched out.

22. A method in accordance with claim 19 wherein the step of determining further comprises:

comparing the difference to a reference signal to produce a decision control signal; and determining, responsive to the decision control signal, the validity of the received signal.

23. A method in accordance with claim 19 further comprising the steps of:

storing in a memory the measured amplitude of the received signal; and storing in a memory the measured attenuated amplitude of the attenuated received signal.

24. A method in accordance with claim 19 further comprising the step of determining the invalidity of the received signal.

25. A method in accordance with claim 19 further comprising the step of storing in a memory the amplitude of the received signal if the received signal is determined to be valid.

26. A method in accordance with claim 19 wherein the step of determining further comprises the step of establishing decision regions, each region having a range of amplitudes, for determining the validity of the received signal.

27. A method in accordance with claim 26 wherein the step of establishing further comprises:

establishing a first decision region wherein the difference indicates that the received signal is valid; and establishing a second decision region wherein the difference indicates that the received signal is invalid.

28. A method in accordance with claim 26 further comprising the step of establishing a third decision region wherein the difference indicates that the received signal is neither valid nor invalid.

29. A method in accordance with claim 19 further comprising the step of measuring the amplitude of the received signal and the attenuated amplitude of the attenuated received signal within a predetermined time.

30. A method in accordance with claim 19 further comprising the step of taking a plurality of measurements of the amplitude of the received signal and the attenuated amplitude of the attenuated received signal.

31. A method for minimizing intermodulation distortion in a radio frequency receiver that receives an input signal having an amplitude, the method comprising the steps of:

switchably coupling an attenuating means, responsive to a control signal and having a predetermined magnitude of attenuation, to the input signal for producing an attenuated input signal having an attenuated amplitude;

coupling nonlinear receiving means to the attenuating means for producing a received signal and an attenuated received signal corresponding to the input signal and the attenuated input signal, respectively;

measuring the amplitude of said received signal and the attenuated amplitude of the attenuated received signal to produce a measured amplitude of the received signal and a measured attenuated amplitude of the attenuated received signal, respectively;

generating a difference signal responsive to a difference between the measured amplitude of the received signal and the measured attenuated amplitude of the attenuated received signal;

comparing the difference signal to the predetermined magnitude of attenuation to produce a decision control signal;

determining, responsive to the decision control signal, the validity of the received signal;

storing a plurality of the received signals responsive to the determined validity of the received signals;

ranking the stored received signals responsive to the amplitude of the stored received signals; and selecting a control channel for the radio frequency receiver responsive to the ranking of the stored received signals.

* * * * *